US012026277B2

(12) United States Patent
Kim

(10) Patent No.: US 12,026,277 B2
(45) Date of Patent: Jul. 2, 2024

(54) ELECTRONIC DEVICE FOR MANAGING PERSONAL INFORMATION AND METHOD THEREFOR

(71) Applicant: Samsung Electronics Co., Ltd., Gyeonggi-do (KR)

(72) Inventor: Geunyong Kim, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 293 days.

(21) Appl. No.: 17/427,719

(22) PCT Filed: Jan. 10, 2020

(86) PCT No.: PCT/KR2020/000521
§ 371 (c)(1),
(2) Date: Aug. 2, 2021

(87) PCT Pub. No.: WO2020/159104
PCT Pub. Date: Aug. 6, 2020

(65) Prior Publication Data
US 2022/0129578 A1    Apr. 28, 2022

(30) Foreign Application Priority Data
Feb. 1, 2019    (KR) .................. 10-2019-0013397

(51) Int. Cl.
    *G06F 21/62*    (2013.01)
    *G06F 21/71*    (2013.01)
(52) U.S. Cl.
    CPC .......... *G06F 21/6245* (2013.01); *G06F 21/71* (2013.01)

(58) Field of Classification Search
None
See application file for complete search history.

(56) References Cited

U.S. PATENT DOCUMENTS 8,751,535 B1    6/2014 Kim
2004/0260948 A1    12/2004 Miyata et al.
(Continued)

FOREIGN PATENT DOCUMENTS

JP    2005242813 A  *  9/2005
JP    2006-85720 A     3/2006
(Continued)

OTHER PUBLICATIONS

Iizuka Takeshi, "Data Communication System and Method" JP2005242813A (2005) English Machine Translation (Year: 2005).*
Korean Examination Report dated May 26, 2023.

*Primary Examiner* — Piotr Poltorak
*Assistant Examiner* — Felicia Farrow
(74) *Attorney, Agent, or Firm* — Cha & Reiter, LLC

(57) ABSTRACT

An electronic device includes a communication module, a processor, and a memory storing instructions, and the processor executes instructions to implement operations including: receiving a request to update first user information from an external electronic device through the communication module, identifying a processing order of the update of the first user information for the plurality of service servers, based on the stored relationship information, and transmit the request for processing the first user information to at least a first service server from among the plurality of service servers through the communication module, based on the identified processing order.

11 Claims, 16 Drawing Sheets

(56) References Cited

U.S. PATENT DOCUMENTS

| | | | |
|---|---|---|---|
| 2014/0013439 A1 | 1/2014 | Koike | |
| 2018/0218168 A1* | 8/2018 | Goel | ................... G06F 21/6245 |
| 2019/0340387 A1* | 11/2019 | Barday | ............... G06F 21/6245 |
| 2021/0279363 A1* | 9/2021 | Jones | .................. G06F 16/9558 |

FOREIGN PATENT DOCUMENTS

| | | |
|---|---|---|
| JP | 2007-219634 A | 8/2007 |
| JP | 2010-86080 A | 4/2010 |
| JP | 2012-208670 A | 10/2012 |
| JP | 2015-108903 A | 6/2015 |
| JP | 2019-133302 A | 8/2019 |

* cited by examiner

```
{"service_list" :
{
  "target_service_cd":"GKSCD10002", ~901
  "target_service_nm":"PENUP", ~903
  "request_data":[
   {
     "source_service_cd":"GKSCD10007", ~905
     "source_service_nm":"Samsung Themes", ~907
     "process_order":"1", ~909
       "process_key":"nwzyyt2dxc", ~911
                "account_id":"gatekeeper_prd_test_0001@samsung.com",
     "event_type":"E", ~915
     "event_sub_type":"R", ~917
     "resend_count":"11", ~919
     "issue_date":"20180701021032", ~921
     "ticket_id":" GDPR-291161-GKSCD10002", ~923
     "ticket_count":"10", ~925
     "parent_ticket_id":" GDPR-291160" ~927
   }]},
   ...
}
```

FIG.9

Look up information processing status

Monitoring

-Requested Service

Search

| Search Method | GK ID | ∨ | | |
|---|---|---|---|---|
| Date | 2018-7-9 | ∨ | 2018-7-16 | |
| Filter By | Service | ∨ | Request Type | ∨ | Request Sub Type | ∨ | Status | ∨ |

Q Search

-Service Processing

All List

| No. | Parent Ticket ID | Ticket ID | Service Name | GUID | Request type | Request Sub type | Status | Created Time |
|---|---|---|---|---|---|---|---|---|
| 1 | GDPR-602852 | GDPR-602852-GKSCD10004 | Samsung Social | k5v5cwhhpb | Erasure | Register | Wait | 2018-07-15 05:07 |
| 2 | GDPR-602852 | GDPR-602852-GKSCD10005 | Bixby Voice | k5v5cwhhpb | Erasure | Register | Wait | 2018-07-15 05:07 |
| 3 | GDPR-602852 | GDPR-602852-GKSCD10006 | Galaxy Apps | k5v5cwhhpb | Erasure | Register | Wait | 2018-07-15 05:07 |
| 4 | GDPR-602852 | GDPR-602852-GKSCD10007 | Samsung Themes | k5v5cwhhpb | Erasure | Register | Wait | 2018-07-15 05:07 |
| 5 | GDPR-602852 | GDPR-602852-GKSCD10008 | Samsung Pay | k5v5cwhhpb | Erasure | Register | Wait | 2018-07-15 05:07 |
| 6 | GDPR-602852 | GDPR-602852-GKSCD10009 | Samsung Members | k5v5cwhhpb | Erasure | Register | Wait | 2018-07-15 05:07 |
| 7 | GDPR-602852 | GDPR-602852-GKSCD10010 | SmartThings | k5v5cwhhpb | Erasure | Register | Wait | 2018-07-15 05:07 |
| 8 | GDPR-602852 | GDPR-602852-GKSCD10002 | PENUP | k5v5cwhhpb | Erasure | Register | Wait | 2018-07-15 05:07 |
| 9 | GDPR-602852 | GDPR-602852-GKSCD10011 | Samsung Cloud | k5v5cwhhpb | Erasure | Register | Wait | 2018-07-15 05:07 |
| 10 | GDPR-602852 | GDPR-602852-GKSCD10013 | Gear Apps | k5v5cwhhpb | Erasure | Register | Wait | 2018-07-15 05:07 |

Look up information processing status

Monitoring

-Requested Service

Requested Service

Search

| Search Method | GK ID | ∨ | | |
|---|---|---|---|---|
| Date | 2018-7-9 | ∨ | 2018-7-16 | |
| Filter By | Service | ∨ | Request Type | ∨ | Request Sub Type | ∨ | Status | ∨ |

Q Search

-Service Processing

All List

| No. | Parent Ticket ID | Ticket ID | Service Name | GUID | Request type | Request Sub type | Status | Created Time |
|---|---|---|---|---|---|---|---|---|
| 1 | GDPR-602852 | GDPR-602852-GKSCD10004 | Samsung Social | k5v5cwhhpb | Erasure | Register | Transferred | 2018-07-15 05:07 |
| 2 | GDPR-602852 | GDPR-602852-GKSCD10005 | Bixby Voice | k5v5cwhhpb | Erasure | Register | Transferred | 2018-07-15 05:07 |
| 3 | GDPR-602852 | GDPR-602852-GKSCD10006 | Galaxy Apps | k5v5cwhhpb | Erasure | Register | Transferred | 2018-07-15 05:07 |
| 4 | GDPR-602852 | GDPR-602852-GKSCD10007 | Samsung Themes | k5v5cwhhpb | Erasure | Register | Transferred | 2018-07-15 05:07 |
| 5 | GDPR-602852 | GDPR-602852-GKSCD10008 | Samsung Pay | k5v5cwhhpb | Erasure | Register | Transferred | 2018-07-15 05:07 |
| 6 | GDPR-602852 | GDPR-602852-GKSCD10009 | Samsung Members | k5v5cwhhpb | Erasure | Register | Transferred | 2018-07-15 05:07 |
| 7 | GDPR-602852 | GDPR-602852-GKSCD10010 | SmartThings | k5v5cwhhpb | Erasure | Register | Transferred | 2018-07-15 05:07 |
| 8 | GDPR-602852 | GDPR-602852-GKSCD10002 | PENUP | k5v5cwhhpb | Erasure | Register | Transferred | 2018-07-15 05:07 |
| 9 | GDPR-602852 | GDPR-602852-GKSCD10011 | Samsung Cloud | k5v5cwhhpb | Erasure | Register | Transferred | 2018-07-15 05:07 |
| 10 | GDPR-602852 | GDPR-602852-GKSCD10013 | Gear Apps | k5v5cwhhpb | Erasure | Register | Transferred | 2018-07-15 05:07 |

| No. | Parent Ticket ID | Ticket ID | Service Name | GUID | Request type | Request Sub type | VOC Service | Status | Status Code | Transferred Time |
|---|---|---|---|---|---|---|---|---|---|---|
| 1 | GDPR-602852 | GDPR-602852-GKSCD10004 | Samsugn Health | k5v5cwhpb | Erasure | Register | Samsung Social | Processing | - | 2018-07-16 06:07 |
| 2 | GDPR-602852 | GDPR-602852-GKSCD10005 | PPMT | k5v5cwhpb | Erasure | Register | Bixby Voice | Processing | - | 2018-07-16 06:07 |
| 3 | GDPR-602852 | GDPR-602852-GKSCD10005 | BigDataPlatform | k5v5cwhpb | Erasure | Register | Bixby Voice | Processing | - | 2018-07-16 06:07 |
| 4 | GDPR-602852 | GDPR-602852-GKSCD10006 | Samsung Billing | k5v5cwhpb | Erasure | Register | Galaxy Apps | Processing | - | 2018-07-16 06:07 |
| 5 | GDPR-602852 | GDPR-602852-GKSCD10006 | BigDataPlatform | k5v5cwhpb | Erasure | Register | Galaxy Apps | Processing | - | 2018-07-16 06:07 |
| 6 | GDPR-602852 | GDPR-602852-GKSCD10007 | PENUP | k5v5cwhpb | Erasure | Register | Samsung Themes | Processing | - | 2018-07-16 06:07 |
| 7 | GDPR-602852 | GDPR-602852-GKSCD10007 | PPMT | k5v5cwhpb | Erasure | Register | Samsung Themes | Processing | - | 2018-07-16 06:07 |
| 8 | GDPR-602852 | GDPR-602852-GKSCD10007 | Samsung Billing | k5v5cwhpb | Erasure | Register | Samsung Themes | Processing | - | 2018-07-16 06:07 |
| 9 | GDPR-602852 | GDPR-602852-GKSCD10007 | BigDataPlatform | k5v5cwhpb | Erasure | Register | Samsung Themes | Processing | - | 2018-07-16 06:07 |
| 10 | GDPR-602852 | GDPR-602852-GKSCD10008 | PPMT | k5v5cwhpb | Erasure | Register | Samsung Pay | Processing | - | 2018-07-16 06:07 |

Look up information processing status

Monitoring

-Requested Service

Requested Service

Search

Search Method: GK ID

Date: 2018-7-9 — 2018-7-16

Filter By: Service / Request Type / Request Sub Type / VOC Service
Status / Status Code Q Search -Service Processing All List

1130

Look up information processing status

Monitoring

-Requested Service

Search

| Search Method | GK ID | v | | |
|---|---|---|---|---|
| Date | 2018-7-9 | v | 2018-7-16 | |
| Filter By | Service | v | Request Type | v | Request Sub Type | v |
| | Status | v | Status Code | v | VOC Service | v |

Q Search

-Service Processing

All List

| No. | Parent Ticket ID | Ticket ID | Service Name | GUID | Request type | Request Sub type | VOC Service | Status | Status Code | Transferred Time |
|---|---|---|---|---|---|---|---|---|---|---|
| 1 | GDPR-602852 | GDPR-602852-GKSCD10004 | Samsugn Health | k5v5cwhhpb | Erasure | Register | Samsung Social | Complete | 201 | 2018-07-16 06:07 |
| 2 | GDPR-602852 | GDPR-602852-GKSCD10005 | PPMT | k5v5cwhhpb | Erasure | Register | Bixby Voice | Complete | 200 | 2018-07-16 06:07 |
| 3 | GDPR-602852 | GDPR-602852-GKSCD10005 | BigDataPlatform | k5v5cwhhpb | Erasure | Register | Bixby Voice | Complete | 200 | 2018-07-16 06:07 |
| 4 | GDPR-602852 | GDPR-602852-GKSCD10006 | Samsung Billing | k5v5cwhhpb | Erasure | Register | Galaxy Apps | Complete | 201 | 2018-07-16 06:07 |
| 5 | GDPR-602852 | GDPR-602852-GKSCD10006 | BigDataPlatform | k5v5cwhhpb | Erasure | Register | Galaxy Apps | Processing | - | 2018-07-16 06:07 |
| 6 | GDPR-602852 | GDPR-602852-GKSCD10007 | PENUP | k5v5cwhhpb | Erasure | Register | Samsung Themes | Complete | 200 | 2018-07-16 06:07 |
| 7 | GDPR-602852 | GDPR-602852-GKSCD10007 | PPMT | k5v5cwhhpb | Erasure | Register | Samsung Themes | Complete | 201 | 2018-07-16 06:07 |
| 8 | GDPR-602852 | GDPR-602852-GKSCD10007 | Samsung Billing | k5v5cwhhpb | Erasure | Register | Samsung Themes | Fail | 500 | 2018-07-16 06:07 |
| 9 | GDPR-602852 | GDPR-602852-GKSCD10007 | BigDataPlatform | k5v5cwhhpb | Erasure | Register | Samsung Themes | Complete | 200 | 2018-07-16 06:07 |
| 10 | GDPR-602852 | GDPR-602852-GKSCD10008 | PPMT | k5v5cwhhpb | Erasure | Register | Samsung Pay | Complete | 200 | 2018-07-16 06:07 |

Look up information processing status

Monitoring

-Requested Service

Search

| Search Method | GK ID | ∨ | | |
|---|---|---|---|---|
| Date | 2018-7-9 | ∨ | 2018-7-16 | |
| Filter By | Service | ∨ | Request Type | ∨ | Request Sub Type | ∨ | VOC Service | ∨ |
| | Status | ∨ | Status Code | ∨ | | | | |

[Q Search]

-Service Processing

All List

| No. | Parent Ticket ID | Ticket ID | Service Name | GUID | Request type | Request Sub type | VOC Service | Status | Status Code | Transferred Time |
|---|---|---|---|---|---|---|---|---|---|---|
| 1 | GDPR-602852 | GDPR-602852-GKSCD10004 | Samsugn Health | k5v5cwhpb | Erasure | Register | Samsung Social | Complete | 201 | 2018-07-16 06:07 |
| 2 | GDPR-602852 | GDPR-602852-GKSCD10005 | PPMT | k5v5cwhpb | Erasure | Register | Bixby Voice | Complete | 200 | 2018-07-16 06:07 |
| 3 | GDPR-602852 | GDPR-602852-GKSCD10005 | BigDataPlatform | k5v5cwhpb | Erasure | Register | Bixby Voice | Complete | 200 | 2018-07-16 06:07 |
| 4 | GDPR-602852 | GDPR-602852-GKSCD10006 | Samsung Billing | k5v5cwhpb | Erasure | Register | Galaxy Apps | Complete | 201 | 2018-07-16 06:07 |
| 5 | GDPR-602852 | GDPR-602852-GKSCD10006 | BigDataPlatform | k5v5cwhpb | Erasure | Register | Galaxy Apps | Resending | - | 2018-07-16 06:07 |
| 6 | GDPR-602852 | GDPR-602852-GKSCD10007 | PENUP | k5v5cwhpb | Erasure | Register | Samsung Themes | Complete | 200 | 2018-07-16 06:07 |
| 7 | GDPR-602852 | GDPR-602852-GKSCD10007 | PPMT | k5v5cwhpb | Erasure | Register | Samsung Themes | Complete | 201 | 2018-07-16 06:07 |
| 8 | GDPR-602852 | GDPR-602852-GKSCD10007 | Samsung Billing | k5v5cwhpb | Erasure | Register | Samsung Themes | Resending | - | 2018-07-16 06:07 |
| 9 | GDPR-602852 | GDPR-602852-GKSCD10007 | BigDataPlatform | k5v5cwhpb | Erasure | Register | Samsung Themes | Complete | 200 | 2018-07-16 06:07 |
| 10 | GDPR-602852 | GDPR-602852-GKSCD10008 | PPMT | k5v5cwhpb | Erasure | Register | Samsung Pay | Complete | 200 | 2018-07-16 06:07 |

ELECTRONIC DEVICE FOR MANAGING PERSONAL INFORMATION AND METHOD THEREFOR

CROSS REFERENCE TO RELATED APPLICATIONS

This application is a National Phase Entry of PCT International Application No. PCT/KR2020/000521, which was filed on Jan. 10, 2020, and claims a priority to Korean Patent Application No. 10-2019-0013397, which was filed on Feb. 1, 2019, the contents of which are incorporated herein by reference.

BACKGROUND

Technical Field

Certain embodiments of the present disclosure relate to electronic devices and methods for processing and managing personal information.

Background Art

With the expansion of services utilizing personal information, there is also a propagation of the personal information across digital networks. For example, an original piece of personal information may be obtained from a specific service server, and may then be copied and used by other service servers, such as in service interoperations and/or marketing. The copied personal information may further be utilized in another service server, or may be further incorporated into "big data" and managed on a macro-level in user profile analysis.

DETAILED DESCRIPTION OF THE INVENTION

As personal information propagates in distribution and utilization to a plurality of service servers, a desirable service may be more easily provided to a user, but management of that personal information may become difficult. For example, when the user intends to correct or delete his/her personal information, the updates for the user's personal information must be propagated and distributed to a plurality of servers is storing the same. Furthermore, verification of the processing result may be desirable.

As the EU's General Data Protection Regulation (GDPR) is put into effect, companies operating in the EU or providing services to EU residents are required to process personal information more safely and accurately. However, since there is no clear rule for processing personal information, and because many procedures are performed manually, complete processing of personal information may be incomplete. Further, data processing times and/or policies may differ from service server to service server, and thus, it may be difficult to batch-process personal information update requests.

According to certain embodiments of the present disclosure, an electronic device and personal information management method are provided that facilitate processing of personal information corresponding to a user's request along a flow path of personal information, and provide feedback on the results of the processing.

According to certain embodiments, an electronic device may include: a communication module, a processor, and a memory operatively connected with the processor and storing relationship information for a plurality of service servers, wherein the memory stores instructions configured to, when executed, cause the processor to: receive a request to update first user information from an external electronic device through the communication module, identify a processing order of the update of the first user information for the plurality of service servers, based on the stored relationship information, and transmit the request for processing the first user information to at least a first service server from among the plurality of service servers through the communication module, based on the identified processing order.

According to certain embodiments, a method in an electronic device is disclosed, including: receiving, a request to update first user information propagated across a plurality of service servers, from an external electronic device, using at least one processor, identifying a processing order to update the first user information across the plurality of servers, based on stored relationship information for the plurality of service servers, and transmitting the request to update the first user information to at least a first service server of the plurality of service servers based on the processing order.

According to certain embodiments, the electronic device and method may determine the order of processing an update to a plurality of service servers, based on the flow path of a user's personal information when it propagated to the plurality of service servers, and update the personal information across those servers using a public processing key, thereby improving user convenience for updating their personal information.

According to certain embodiments, the electronic device and method may facilitate complete processing and updating of a user's personal information even when distributed amongst a plurality of service servers, verify the results of the processing, and report the results to the user.

BRIEF DESCRIPTION OF THE DRAWINGS

Particular embodiments of the present disclosure and the foregoing and other aspects, features, and advantages will be apparent from the following detailed description taken in conjunction with the accompanying drawings, wherein:

FIG. 9 is a view illustrating an example of propagation data generated in response to a request for processing personal information according to certain embodiments of the present disclosure;

FIGS. 11A to 11F are views illustrating an example scheme of providing a request state for personal information and a result regarding the processing state according to certain embodiments of the present disclosure.

DETAILED DESCRIPTION

Figure 1:
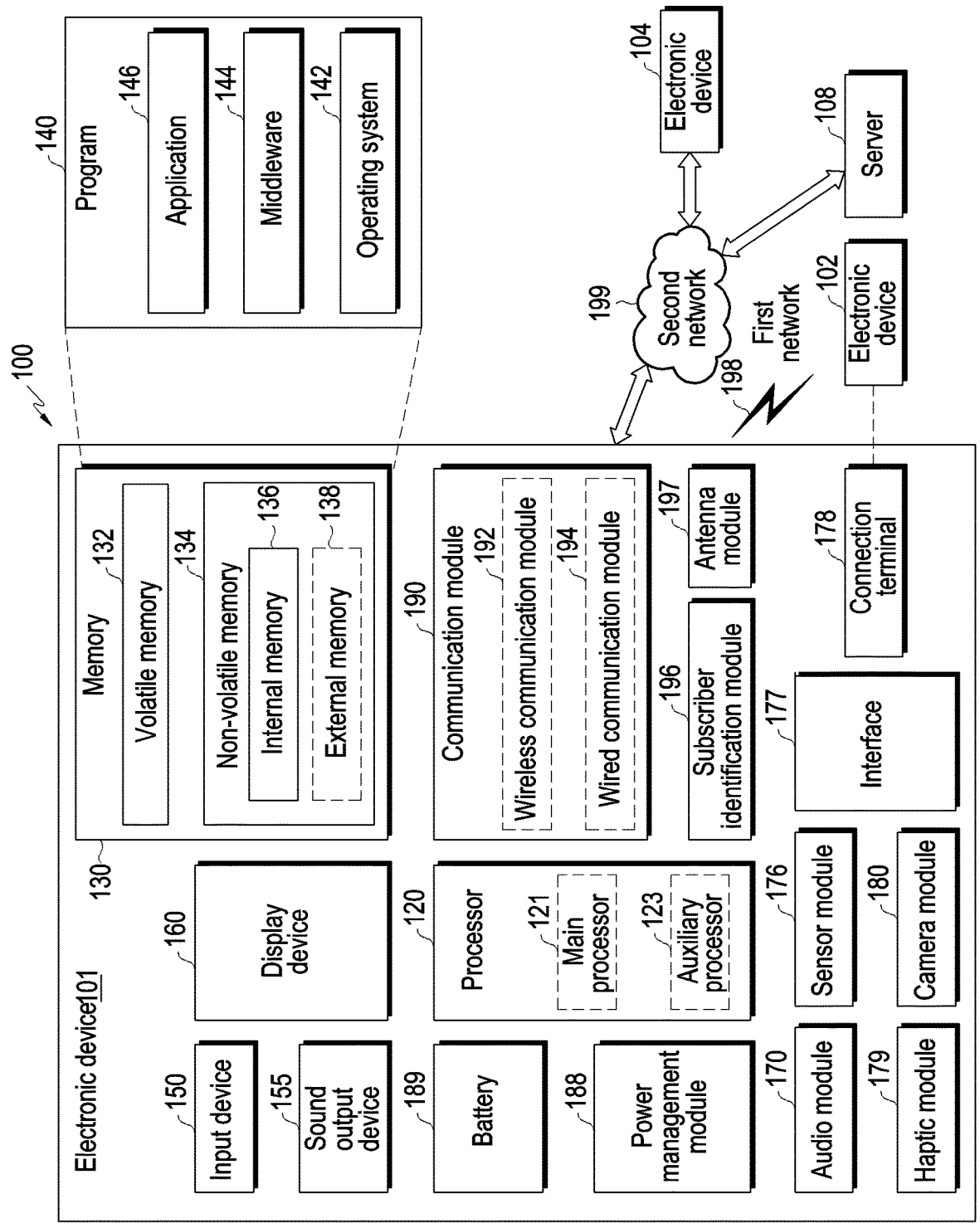
FIG. 1 is a block diagram illustrating an electronic device in a network environment according to certain embodiments of the present disclosure.

Hereinafter, embodiments of the present disclosure are described with reference to the accompanying drawings. However, it should be appreciated that the present disclosure is not limited to the embodiments, and all changes and/or equivalents or replacements thereto also belong to the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

Each of the aforementioned components of the electronic device may include one or more parts, and a name of the part may vary with a type of the electronic device. The electronic device in accordance with certain embodiments of the present disclosure may include at least one of the aforementioned components, omit some of them, or include other additional component(s). Some of the components may be combined into an entity, but the entity may perform the same functions as the components may do.

The terms as used herein are provided merely to describe some embodiments thereof, but not to limit the other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to an embodiment of the present disclosure, the electronic device may be a smart home appliance. For example, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google Tv™, a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, examples of the electronic device may at least one of part of furniture or building/structure, an electronic board, an electronic signature receiving device, a projector, or various measurement devices (e.g., devices for measuring water, electricity, gas, or electromagnetic waves). According to an embodiment, the electronic device may be one or a combination of the above-listed devices. According to some embodiments, the electronic device may be a flexible electronic device. The electronic device disclosed herein is not limited to the above-listed devices, and may include new electronic devices depending on the development of technology.

FIG. 1 is a block diagram illustrating an electronic device in a network environment according to an embodiment;

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
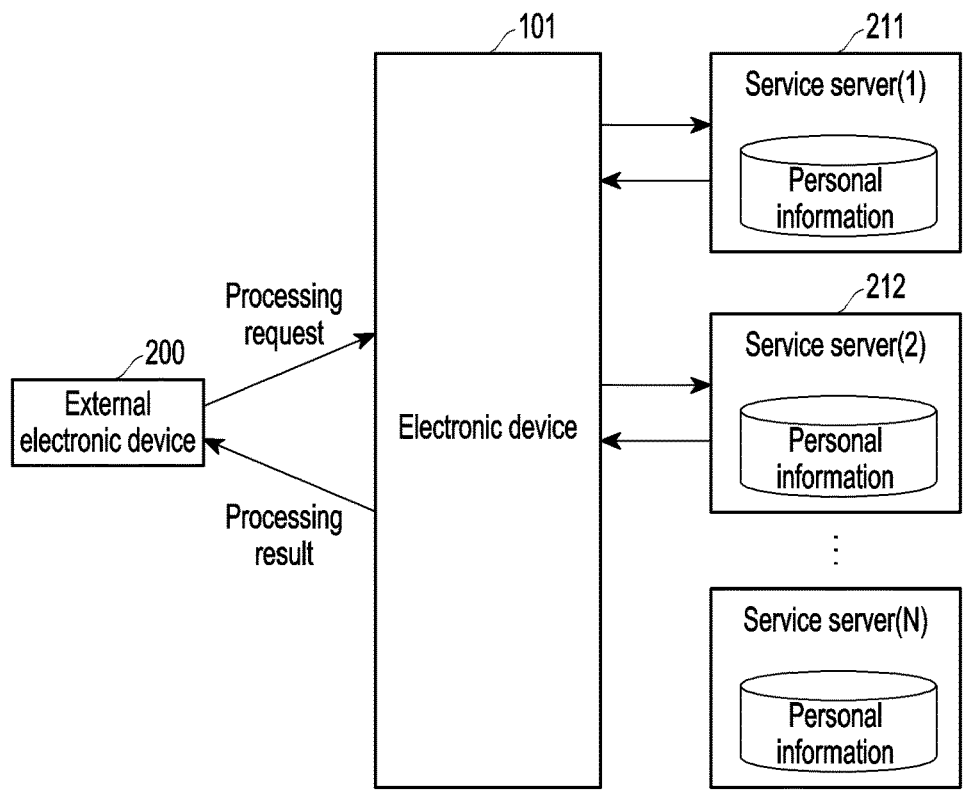
FIG. 2 is a view illustrating a scheme of managing personal information by performing a process corresponding to a user's request along a flow path of personal information according to certain embodiments of the present disclosure.

FIG. 2 is a view illustrating a scheme of managing personal information by performing a process corresponding to a user's request along a flow path of personal information according to certain embodiments of the present disclosure.

Referring to FIG. 2, when a user processes or manages her personal information that is distributed to a plurality of service servers, a personal information processing request may be transmitted to an electronic device 101 through an external electronic device 200. The external electronic device 200 may be a device (e.g., a smartphone or a tablet computer) that may communicate with the electronic device 101 via a network to transmit the personal information processing request, and receive a result thereof. The external electronic device 200 may provide processing of personal information and/or execution of a management service using a web program or application capable of connecting to the electronic device 101. The external electronic device 200 may include an electronic device 102 connected with the electronic device 101 via a first network 198 or an electronic device 104 connected with the electronic device 101 via a second network 199 in FIG. 1.

According to certain embodiments of the present disclosure, the personal information processing request may include at least one of a processing type, an action type, a processing range, or a processing scheme. For example, the processing type may correspond to at least one of an information lookup for viewing or downloading the personal information, information modification for changing at least part of the personal information, information deletion for discarding the personal information, information processing restriction for restricting processing of the personal information for a designated time by freezing the personal information, or information separation retaining for temporarily leaving the personal information dormant. The action type may include registering or clearing the processing of personal information. The processing scheme may refer to processing the personal information in ascending order or descending order according to the processing order determined for the plurality of service servers. The processing range is a range of the service servers that are to process the personal information, and all of the plurality of service servers sharing at least part of the personal information or some service servers associated with a specific service among the plurality of service servers may be designated.

According to certain embodiments of the present disclosure, in response to the reception of the personal information processing request from the external electronic device 200, the electronic device 101 may batch-process the user's personal information that is distributed to the plurality of service servers 211, 212, (N), and transfer the result of the processing to the external electronic device 200. For example, the plurality of service servers may share at least part of the user's personal information and may include a service server that directly obtains the personal information from the external electronic device 200, or a server that indirectly obtains the personal information while interworking with another service server to provide a specific service.

According to certain embodiments of the present disclosure, the electronic device 101 may determine an order of processing the personal information between the plurality of service servers. The processing order may be determined based on the flow path along which the personal information is shared between the plurality of service servers. According to an embodiment, the electronic device 101 may store relationship information between the plurality of service servers, and the relationship information may include map information of a hierarchical structure that defines the flow path along which the personal information is shared between the plurality of service servers. As another example, if the relationship information is not stored in the electronic device 101 at the time the processing order is determined to process the personal information, the electronic device 101 may generate the relationship information based on data received from the plurality of service servers, or obtain the relationship information from the external electronic device.

According to certain embodiments of the present disclosure, the electronic device 101 may generate a processing key for processing the personal information distributed the plurality of service servers. For example, the processing key may be generated based on identification information or non-identification information associated with the personal information. The identification information may be a global unique identification (GUID) for identifying the personal information distributed to the plurality of service servers, and the non-identification information may be the one that has been processed for security by hashing the identification information with a target private key, mapping identification (MAPID).

According to certain embodiments of the present disclosure, the electronic device 101 may generate propagation data for transferring the personal information processing request received from the external electronic device 200, based on the generated processing key and the personal information processing order determined for the plurality of service servers. The propagation data may include at least one of the processing type for the personal information, action type, processing range, processing scheme, processing order, or processing key and may be generated for each of at least one service server 211 and 212 included in the processing range among the plurality of service servers sharing at least part of the personal information. The electronic device 101 may sequentially transmit the generated propagation data to the at least one service server according to the determined processing order.

According to certain embodiments of the present disclosure, upon receiving the propagation data from the electronic device 101, the at least one service server 211 and 212 may perform a process corresponding to the propagation data, on the personal information stored in each server. If the personal information process performed by the at least one service server 211 and 212 is complete, the electronic device 101 may receive the result of processing on the personal information processing request and transfer the same to the external electronic device 200. Thus, management of the personal information may be more convenient for users, and it can be better assured that all instances of the propagated personal information are properly updated.

Figure 3:
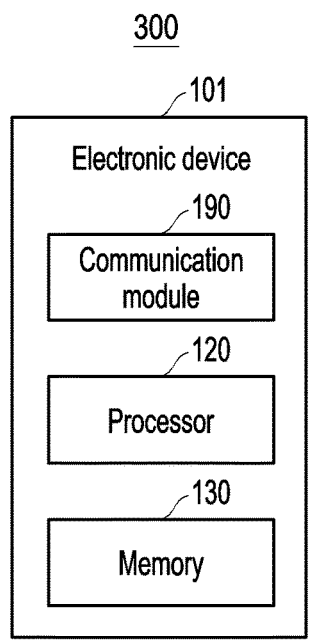
FIG. 3 is a block diagram illustrating an electronic device according to certain embodiments of the present disclosure.

FIG. 3 is a block diagram 300 illustrating an example of an electronic device according to an embodiment. The electronic device 101 may be a device (e.g., a personal information processing system server) that determines an order of processing user information corresponding to a user request between a plurality of service servers sharing the user information to provide a specific service and may include a communication module 190, a processor 120, or a memory 130.

According to certain embodiments of the present disclosure, the memory 130 may store relationship information indicating relationships between a plurality of service servers, each server storing at least one instance of the propagated user information. For example, the relationship information may include a flow path along which the at least one user information is shared (or was historically shared) between the plurality of service servers, and may thus define the relationship between the plurality of service servers in the form of hierarchical map information. According to certain embodiments of the present disclosure, the plurality of service servers may be operated by the same operator, or may be service servers with different operators interworking to provide a specific service.

The memory 130 may store instructions to enable the processor 120 to perform various operations when executed. For example, the processor 120 may receive a request for processing (e.g., updating) first user information from the external electronic device 200 through the communication module 190. The request for processing the first user information may be by the user through the external electronic device 200, and may include at least one item among a processing type, action type, processing range, or processing method for the first user information. All of the items included in the request for processing the first user information may be designated by the user's input, or some items may be designated by the user's input while predesignated values may be input for the other items. For example, if the user inputs two items corresponding to the processing type (e.g., delete) and processing range (e.g., the whole service) for the user's personal information to request to process the personal information, the other items, such as the action type or processing scheme, may be automatically set to predesignated values.

According to certain embodiments of the present disclosure, the processor 120 may determine the order of processing the first user information for the plurality of service servers based on the stored relationship information between the plurality of service servers. The processor 120 may identify the hierarchical order of each of the plurality of servers based on the stored relationship information, and thus determine the order of processing the first user information for the plurality of servers based on the identified hierarchical order. For example, when the processing scheme designated by the request for processing the first user information is set in ascending order, the processing order is determined to correspond to the hierarchical order identified for each of the plurality of servers and, when the processing scheme is in descending order, the processing order may be determined to be an inverse order of the identified hierarchical order.

According to certain embodiments of the present disclosure, the processor 120 may identify the plurality of service servers storing at least part of the first user information using identification information or non-identification information associated with the first user information. The processor 120 may determine the processing order for performing the process corresponding to the request based on the relationship information stored in the memory 130, for each of the plurality of service servers identified as storing at least part of the first user information. The identification information may be a common global unique identification (GUID) used to identify the first user information distributed to the plurality of service servers. Since the identification information may be regarded as part of the first user information by some service servers, the identification information may be separately managed as non-identification information that has been processed for security by hashing the identification information with the mapping identification (MAPID) which is the target private key.

According to certain embodiments of the present disclosure, the processor 120 may generate a processing key for processing the first user information in each of the plurality of service servers, using the identification information or the non-identification information. For example, the processor 120 may search for a non-identification information server storing the non-identification information and identify the identification information server corresponding to the parent node of the non-identification information server based on the relationship information stored in the memory 130, thereby obtaining a mapping key between the identification information and the non-identification information. The processor 120 may generate the processing key that may be commonly used by the plurality of servers to process the first user information using at least part of the identification information or the obtained mapping key.

According to certain embodiments of the present disclosure, the processor 120 may transmit a request for processing the first user information to at least one of the plurality of service servers based on the determined processing order, through the communication module 190. The processor 120 may generate propagation data for transmitting the request for processing the first user information to the at least one service server. The propagation data may be generated based on at least one of the request for processing the first user information, the processing order determined for each of the plurality of service servers in response to the request for processing the first user information, or the processing key generated to process the first user information. The at least one service server may be a processing target server included in the processing range included in the request for processing the first user information among the plurality of service servers. The processor 120 may transmit the generated propagation data to the at least one service server according to the determined processing order.

According to certain embodiments of the present disclosure, the processor 120 may identify whether the first user information or the target service is valid in response to the request for processing the first user information and, if it is identified to be valid, generate a processing session for the first user information. The processor 120 may manage at least one of the processing status or the request status for the request for processing the first user information, using the generated processing session. The request status indicates the progress of the request for processing the first user information, and may be indicated as one of wait, transferred, complete, close, or cancel. The processing status indicates the processing progress for the first user information corresponding to the processing request, and may be indicated as one of none, processing, fail, resending, or complete. When a processing session for the first user information is created, the request status is set to wait and the processing status is set to none and it may be initialized. Thereafter, as the request for processing the first user information is transmitted or the processing of the first user information proceeds, the value of the request status or the processing status may be changed. The processor 120 may identify the request status or the processing status for the request for processing the first user information according to a designated period and, based on the result of the identification, update the status value of the processing session.

According to certain embodiments of the present disclosure, if the processing of the first user information is complete in the at least one service server, the processor 120 may receive a processing result corresponding to the request for processing the first user information through the communication module 190. As another example, the processor 120 may receive a report of the processing result including the processing status for the first user information in the at least one server, according to a designated period. The processor 120 may transmit a feedback for the request for processing the first user information to the external electronic device 200 based on the received processing result.

According to an embodiment of the present disclosure, an electronic device 101 may include a communication module 190, a processor 120, and a memory 130 operatively connected with the processor and storing relationship information between a plurality of service servers (e.g., the service server 1 211 and the service server 2 212 of FIG. 2) each storing at least one user information. The memory 130 may store instructions configured to, when executed, enable the processor 120 to receive a request for processing first user information from an external electronic device through the communication module 190, identify a processing order of the first user information for the plurality of service servers, based on the relationship information between the plurality of service servers, and transmit the request for processing the first user information to at least one of the plurality of service servers through the communication module 190, based on the processing order.

According to an embodiment of the present disclosure, the instructions may be configured to, when executed, enable the processor 120 to identify the plurality of service servers storing at least part of the first user information using identification information or non-identification information associated with the first user information, and identify a processing order for each of the plurality of service servers based on the relationship information.

According to certain embodiments of the present disclosure, the instructions may be configured to, when executed, enable the processor 120 to search for a non-identification information server storing non-identification information associated with the first user information, identify an identification information server corresponding to a parent node of the non-identification information server based on the relationship information, and generate a processing key corresponding to the request for processing the first user information, using at least part of a mapping key between the non-identification information server and the identification information server or a unique key of the identification information server.

According to certain embodiments of the present disclosure, the relationship information may include hierarchical map information defining a flow path of the first user information between the plurality of service servers.

According to certain embodiments of the present disclosure, the instructions may be configured to, when executed, enable the processor 120 to identify a hierarchical order of each of the plurality of servers based on the relationship information, and sequentially transmit the request for processing the first user information to each of the plurality of servers according to a processing order identified based on the hierarchical order.

According to certain embodiments of the present disclosure, the request for processing the first user information may include at least one of a processing type, action type, processing range, or processing scheme for the first user information.

According to certain embodiments of the present disclosure, the instructions may be configured to, when executed, enable the processor 120 to generate propagation data for the at least one service server, based on at least one of the request for processing the first user information, a processing order or processing key identified for the request for processing the first user information, and transmit the propagation data to the at least one service server.

According to certain embodiments of the present disclosure, the instructions may be configured to, when executed, enable the processor 120 to generate a processing session corresponding to the request for processing the first user information, and manage at least one of a request status or a processing status for the request for processing the first user information using the processing session.

According to certain embodiments of the present disclosure, the instructions may enable the processor 120 to identify the request status or the processing status for the first user information processing request according to a designated period, and update a status value of the processing session based on a result of the identification.

According to certain embodiments of the present disclosure, the instructions may be configured to, when executed, enable the processor 120 to receive a processing result corresponding to the request for processing the first user information from the at least one server through the communication module 190 and transmit a feedback for the request for processing the first user information to the external electronic device 200 based on the received processing result.

Figure 4A:
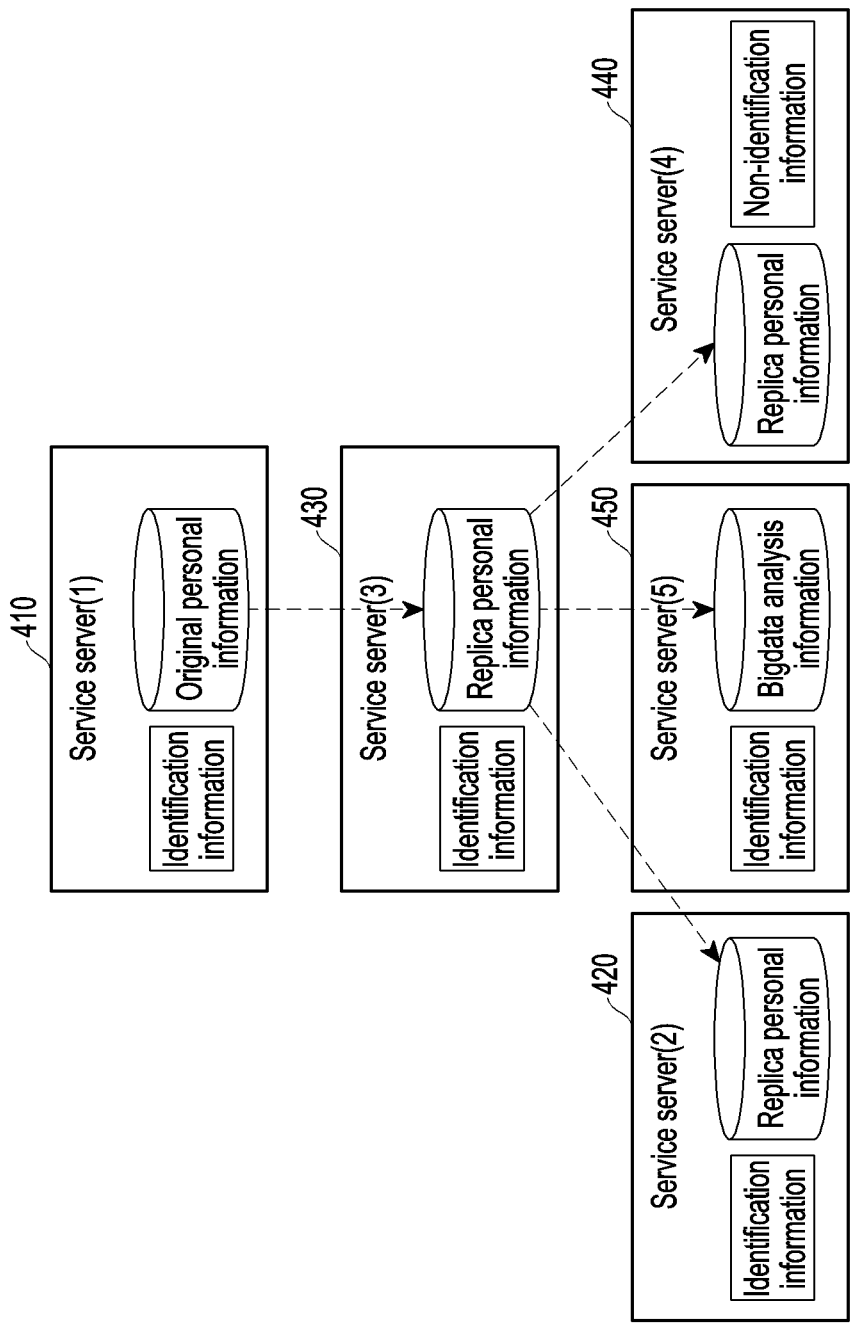
FIG. 4A is a view illustrating a flow path of personal information according to certain embodiments of the present disclosure.
Figure 4B:
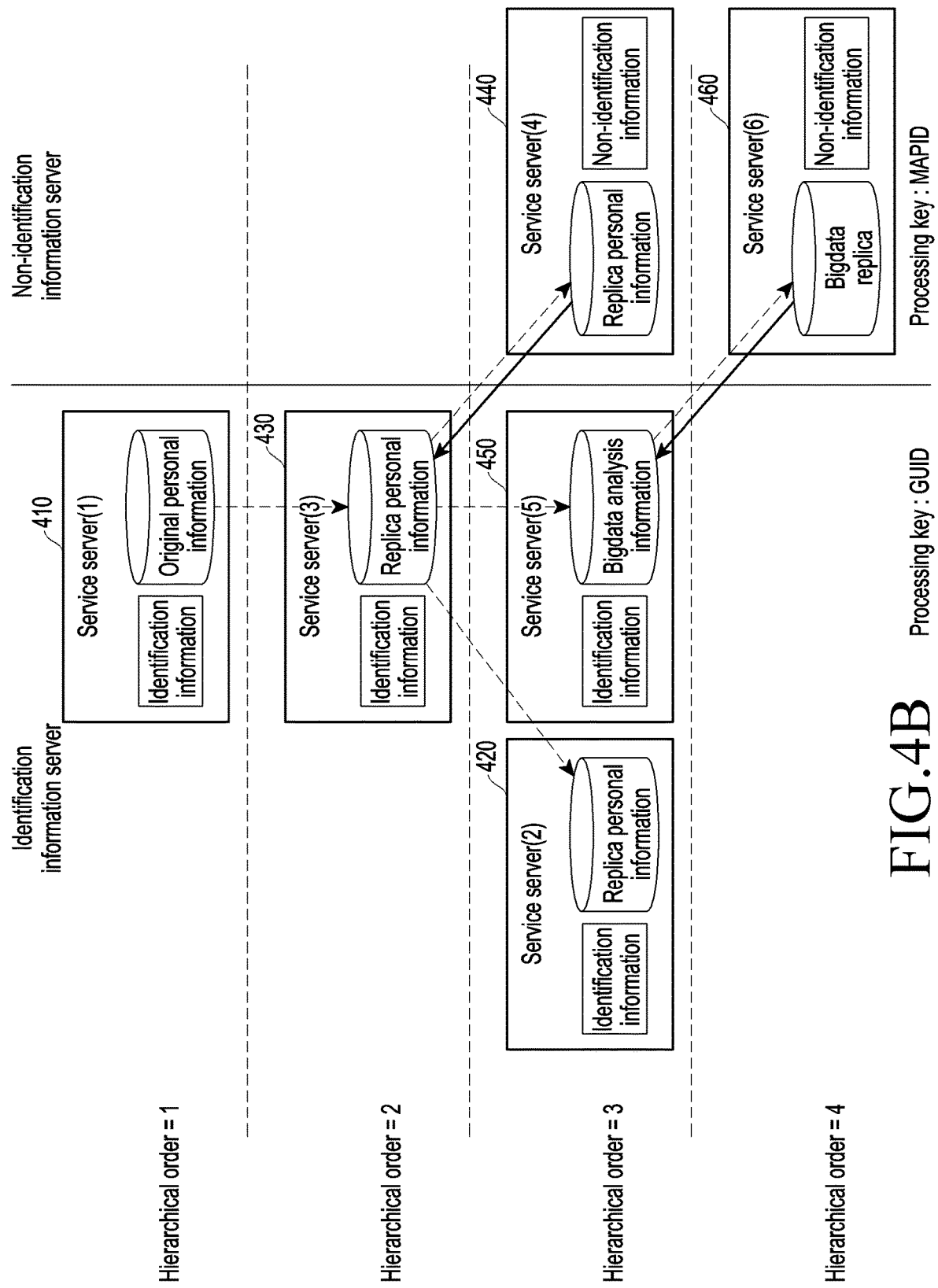
FIG. 4B is a view illustrating relationship information between a plurality of service servers corresponding to a flow path of personal information according to certain embodiments of the present disclosure.

FIG. 4A is a view illustrating a flow path of personal information according to certain embodiments of the present disclosure; FIG. 4B is a view illustrating relationship information between a plurality of service servers corresponding to a flow path of personal information according to certain embodiments of the present disclosure.

Referring to FIG. 4A, a service server 1 410 may store personal information directly obtained from the user, and service servers 2, 3, 4, and 5 420, 430, 440, and 450 may store personal information indirectly obtained, that is, through another service server rather than from the user directly. The service servers 1 to 5 410, 420, 430, 440, and 450 may correspond to at least one service server 211 and 212 of FIG. 2. The personal information directly obtained by the service server 1 410 is the original personal information input from the user, and the personal information obtained indirectly by the service servers 2, 3, 4, and 5 420, 430, 440, and 450 may include at least one of replica personal information obtained from copying at least part of the original personal information or analysis information resultant from processing and storing at least part of the personal information. For example, the original personal information stored in the service server 1 410 may be copied by the service server 3 430 and shared. The replica personal information stored in the service server 3 430 may be recopied by the service server 2 420 or at least part of the replica personal information may be processed by the service server 5 450 and may be stored as "bigdata" analysis information. As another example, the replica personal information in the service server 3 430 may be left to the service server 4 440 for third party interworking and may be stored as third-party replica personal information. The personal information may be shared by a plurality of service servers for marketing purposes or for providing services, and the plurality of service servers may also manage identification information for identifying the distributed personal information. According to certain embodiments of the present disclosure, when the personal information is left to another service server due via third party interworking, the identification information may also be included as part of the personal information. To prevent illicit leakage of the identification information, the non-identification information obtained via hashing and processing the identification information with a mapping identification (MAPID), such as the private key, may be separately managed, thereby reinforcing security.

Relationship information between the plurality of service servers may be generated based on the flow path along which the personal information is shared (e.g., propagated) between the plurality of service servers as shown in FIG. 4A, and this may be represented in a hierarchical map structure as shown in FIG. 4B.

Referring to FIG. 4B, the plurality of service servers may be divided by hierarchical orders along the flow path of the personal information, and the respective hierarchical orders of the plurality of service servers may be defined as shown in Table 1.

TABLE 1

| Hierarchical order | Service server number |
| --- | --- |
| 1 | service server 1 (410) |
| 2 | service server 3 (430) |
| 3 | service servers 2, 5, and 4 (420, 450, and 440) |
| 4 | service server 6 (460) |

For example, the service server 1 410 storing the original personal information that was directly input from the user may be denoted with hierarchical order 1, and the service server 3 430 which received a copy of the original personal information of the service server 1 410 may be denoted with hierarchical order 2. The service server 2 420 which recopied and stored the replica personal information stored in the service server 3 430, the service server 5 450 which processed at least part of the replica personal information and stored the result as bigdata analysis information, and/or the service server 4 440 which stored the third-party replica personal information may be denoted with hierarchical order 3. According to certain embodiments of the present disclosure, the bigdata analysis information of the service server 5 450 may be relegated to the service server 6 460 for interworking with other services and stored as third-party replica bigdata. Thus, the service server 6 460 storing the third-party replica bigdata may be denoted with hierarchical order 4.

According to certain embodiments of the present disclosure, the plurality of service servers together may manage the identification information including a common global unique identification (GUID) for identifying the personal information distributed to the plurality of service servers and perform a process corresponding to the personal information processing request using the identification information. According to certain embodiments of the present disclosure, the service server 4 440 and the service server 6 460 to which the personal information has been left for third party interworking may separately manage the identification information as non-identification information resultant from processing the identification information for security purposes by hashing the identification information with the mapping identification (MAPID), the private key, thereby preventing leakage of the identification information. Among the plurality of service servers, the service server managing the identification information may be denoted as an identification information server, and the service server managing the non-identification information may be denoted as a non-identification information server.

Figure 5:
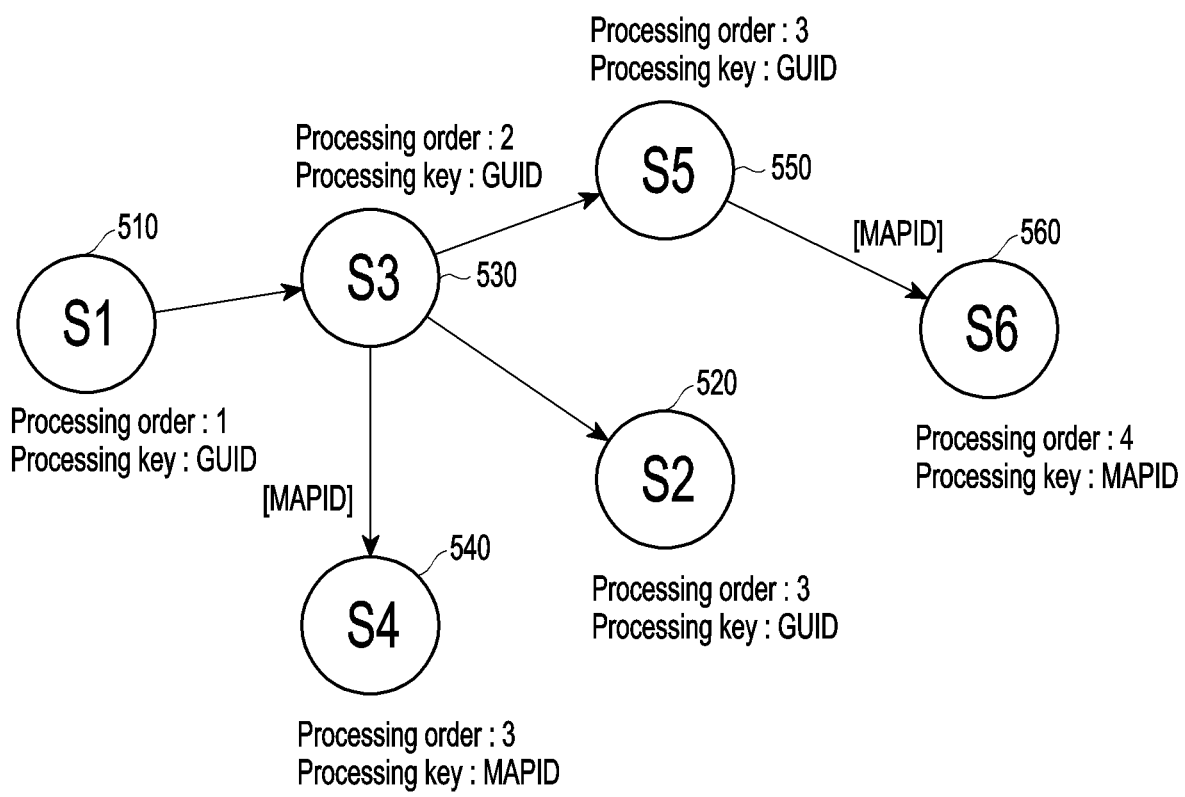
FIG. 5 is a view illustrating a process of determining a personal information processing scheme of each of a plurality of service servers according to certain embodiments of the present disclosure.

FIG. 5 is a view illustrating a process of determining a personal information processing scheme of each of a plurality of service servers according to certain embodiments of the present disclosure. The electronic device 101 may determine a processing order for each of the plurality of service servers in response to a request for processing/updating user information, and generate a processing key for processing the user information.

The electronic device 101 may identify a flow path along which the user information is shared, based on the relationship information between the plurality of service servers, as shown in FIG. 4B. For example, the electronic device 101 may identify that the user information was copied from the service server 1 410 to the service server 3 430 and shared, recopied from the service server 3 430 to the service server 2 420 or copied to the service server 4 440 for third party interworking and shared. As another example, the electronic device 101 may identify that the user information of the service server 3 430 is processed into bigdata analysis information and shared with the service server 5 450, and the bigdata analysis information of the service server 5 450 is copied to the service server 6 460 for third party interworking and shared. An information processing scheme for each server node may be defined as shown in FIG. 5, corresponding to the identified flow path of the user information. Referring to FIG. 5, in a node S1 510 corresponding to the service server 1 410, the processing order may be designated as '1' which corresponds to the hierarchical order of the service server 1 410, determined based on the relationship information of FIG. 4B, and the processing key may be designated as the GUID corresponding to the identification information of the service server 1 410. In a node S3 530 corresponding to the service server 3 430, '2' corresponding to the hierarchical order of the service server 3 430 may be designated as the processing order, and the GUID corresponding to the identification information of the service server 3 430 may be designated as the processing key. In a node S2 520, the hierarchical order '3' and the identification information 'GUID' corresponding to the service server 2 420 may be designated as the processing order and the processing key, respectively, and, in a node S5 550, the hierarchical order '3' and the identification information 'GUID' corresponding to the service server 5 450 may be designated as the processing order and the processing key, respectively. In a node S4 540 corresponding to the service server 4 440 sharing the user information by third party interworking, a processing order corresponding to the hierarchical order '3' and a processing key corresponding to the MAPID which results from security-processing the identification information may be designated. In a node S6 560 corresponding to the service server 6 460 sharing the user information of the service server 5 450 by third party interworking, a processing order corresponding to the hierarchical order '4' and a processing key corresponding to the MAPID which results from security-processing the identification information may be designated.

According to certain embodiments of the present disclosure, the processing order for each server may be set to be a reverse (i.e., inverted) order of the operation, or may be set to correspond to the hierarchical order, according to the processing scheme designated by the user information processing/updating request. For example, when the processing scheme is designated as 'ascending order,' the processing order of the nodes may be determined to be the same as the hierarchical order of the service server corresponding to each node and, when the processing scheme is designated as 'descending order,' the processing order of the nodes may be determined to be a reverse/inverse order of the hierarchical order of the service server corresponding to the node.

According to certain embodiments of the present disclosure, the electronic device 101 may receive, from the external electronic device 200, a user information processing request instructed to "delete the user information associated with all the services in descending order" as set forth in Table 2 below.

TABLE 2

| Processing type | Action type | Processing range | Processing scheme |
| --- | --- | --- | --- |
| delete information | register | all | descending order (DESC) |

The electronic device 101 may identify the plurality of service servers storing at least part of the user information and determine the processing order of the plurality of servers to process the user information distributed to the plurality of servers. The processing order may be determined based on the relationship information between the plurality of servers defined as illustrated in FIG. 4B, corresponding to the flow path along which the user information is shared between the plurality of servers. According to certain embodiments of the present disclosure, the electronic device 101 may generate a processing key for processing the user information distributed to the plurality of service servers. The processing key may be generated based on identification information or non-identification information associated with the user information. For example, the identification information may be designated as a common global unique identification (GUID) for identifying the personal information distributed to the plurality of service servers, and the service servers differentiated as identification information servers by the relationship information may use the identification information as the processing key. The non-identification information may be designated as a target private key mapping identification (MAPID) that is used to security-process the identification information, and the service servers differentiated as non-identification information servers by the relationship information may use the non-identification information as the processing key.

According to certain embodiments of the present disclosure, the electronic device 101 may map at least one of the processing/updating order determined for the plurality of service servers or the processing key generated to process the user information to the user information processing request, generating a processing list as set forth in Table 3.

TABLE 3

| Service server | Hierarchical order | Processing order | Processing type | Action type | Processing key |
|---|---|---|---|---|---|
| 1 | 1 | 4 | delete | register processing | GUID |
| 2 | 3 | 2 | delete | register processing | GUID |
| 3 | 2 | 3 | delete | register processing | GUID |
| 4 | 3 | 2 | delete | register processing | MAPID |
| 5 | 3 | 2 | delete | register processing | GUID |
| 6 | 4 | 1 | delete | register processing | MAPID |

Referring to Table 3, the processing order may be designated as a reverse/inverse order of the hierarchical orders of the plurality of service servers according to the processing scheme (i.e., descending order) designated by the user information processing request of Table 2. The plurality of service servers corresponding to all the nodes shown in FIG. 5 may be designated as targets for processing the user information, according to the processing range (i.e., all) designated by the user information processing request of Table 2. As another example, when the processing range is designated to be limited to a specific service, the processing list may be created for the service servers that are identified to be associated with the specific service among the plurality of service servers.

Figure 6:
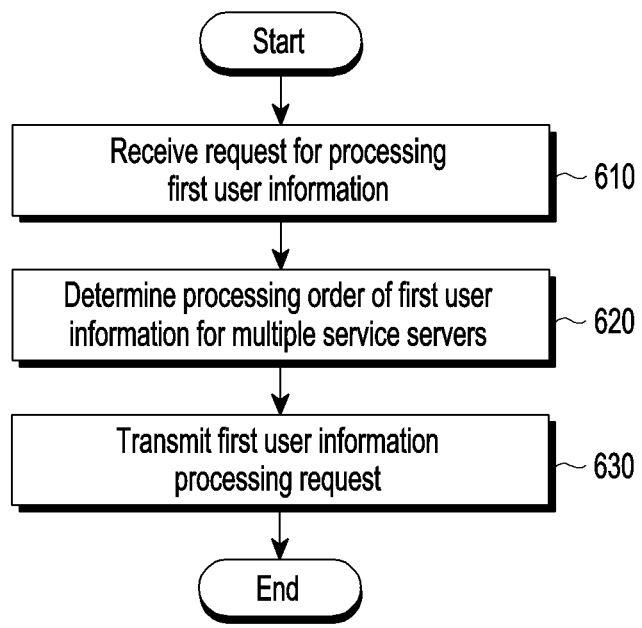
FIG. 6 is a flowchart illustrating a method for managing personal information according to certain embodiments of the present disclosure.

FIG. 6 is a flowchart illustrating a method for managing personal information according to certain embodiments of the present disclosure. According to an embodiment, the electronic device 101 may determine the user information processing order corresponding to the user request between the plurality of service servers sharing the user information and process the user information according to the determined processing order.

Referring to FIG. 6, in operation 610, the electronic device 101 may receive a request for processing/updating first user information through a plurality of service servers, from an external electronic device. The external electronic device may be connected with the electronic device 101 via a network to process personal information, or provide a management service through a web program or application, and may correspond to the electronic device 102 or 104 of FIG. 1 or the external electronic device 200 of FIG. 2. The request for processing the first user information may be input by the user through the external electronic device, and may include at least one item among a processing type, action type, processing range, or processing method for the first user information. All of the items included in the request for processing the first user information may be designated by the user's input, or some items may be designated by the user's input while predesignated values may be input for the other items. For example, if the user inputs two items corresponding to the processing type (e.g., delete) and processing range (e.g., the whole service) for the user's personal information to request to process the personal information, the other items, such as the action type or processing scheme, may be automatically set to predesignated values.

In operation 620, the electronic device 101 may determine the processing order of the first user information for the plurality of service servers, based on the relationship information between the plurality of service servers storing at least one user information. The relationship information may include a flow path along which the at least one user information is shared/propagated between the plurality of service servers, and may define the relationship between the plurality of service servers in the form of a hierarchical map. According to certain embodiments of the present disclosure, the plurality of service servers may be service servers operated by the same operator or may be service servers interworking to provide a specific service.

In operation 620, the electronic device 101 may further identify a hierarchical order of each of the plurality of servers based on the relationship information, and determine the processing order of the update to the first user information for the plurality of service servers based on the identified hierarchical order. For example, when the processing scheme designated by the request for processing the first user information is in "ascending" order, the processing order is determined to correspond to the hierarchical order identified for each of the plurality of servers and, when the processing scheme is in "descending" order, the processing order may be determined to be a reverse/inverse order of the identified hierarchical order. According to certain embodiments of the present disclosure, the electronic device 101 may identify the plurality of service servers storing at least part of the first user information using identification information or non-identification information associated with the first user information and determine the processing order for the plurality of identified service servers based on the relationship information. The identification information may be a common global unique identification (GUID) to identify the first user information distributed to the plurality of service servers. Since the identification information may be regarded as part of the first user information by some service servers, the identification information may be separately managed as non-identification information that has been processed for security by hashing the identification information with the mapping identification (MAPID) which is the target private key. The electronic device 101 may generate a processing key for processing the first user information in the plurality of service servers, using the identification information or the non-identification information. For example, the electronic device 101 may search for a non-identification information server storing the non-identification information and identify the identification information server corresponding to the parent node of the non-identification information server based on the relationship information, thereby obtaining a mapping key between the identification information and the non-identification information. The electronic device 101 may generate the processing key that may be commonly used by the plurality of servers to process the first user information using at least part of the identification information or the obtained mapping key.

In operation 630, the electronic device 101 may transmit a request for processing the first user information to at least one of the plurality of service servers (e.g., to a first service server) based on the determined processing order.

If the processing for the first user information in each of at least one service server is complete after operation 630, the electronic device 101 may receive a processing result corresponding indicating successful updating/processing of the first user information through the plurality of service servers, and transmit feedback regarding the same to the external electronic device 200.

According to an embodiment of the present disclosure, a method for managing personal information may include receiving (610) a request for processing first user information from an external electronic device 200, determining (620) a processing order of the first user information for a plurality of servers, based on relationship information between the plurality of service servers (e.g., the service server 1 410 to the service server 5 450 of FIG. 4A) storing at least one user information, and transmitting (630) the request for processing the first user information to at least one of the plurality of service servers based on the processing order.

According to certain embodiments of the present disclosure, determining (620) the processing order of the first user information may include identifying the plurality of service servers storing at least part of the first user information using identification information or non-identification information associated with the first user information, and determining a processing order for each of the plurality of service servers based on the relationship information.

According to certain embodiments of the present disclosure, determining (620) the processing order of the first user information may include searching for a non-identification information server (e.g., the service server 4 440 of FIG. 4A) storing non-identification information associated with the first user information, identifying an identification information server corresponding to a parent node of the non-identification information server based on the relationship information, and generating a processing key corresponding to the request for processing the first user information, using at least part of a mapping key between the non-identification information server and the identification information server or a unique key of the identification information server.

According to certain embodiments of the present disclosure, the relationship information includes hierarchical map information (e.g., FIG. 4B) defining a flow path of the first user information between the plurality of service servers.

According to certain embodiments of the present disclosure, transmitting (630) the request for processing the first user information may include identifying a hierarchical order of each of the plurality of servers based on the relationship information, and sequentially transmitting the request for processing the first user information to the plurality of servers according to a processing order determined based on the hierarchical order.

According to certain embodiments of the present disclosure, the request for processing the first user information may include at least one of a processing type, action type, processing range, or processing scheme for the first user information.

According to certain embodiments of the present disclosure, transmitting (630) the first user information processing request may include generating propagation data for the at least one service server, based on at least one of the request for processing the first user information, a processing order or processing key identified for the first user information processing request, and transmitting the propagation data to the at least one service server.

According to certain embodiments of the present disclosure, the method may further include generating a processing session corresponding to the request for processing the first user information, and managing at least one of a request status or a processing status for the first user information processing request using the processing session.

According to certain embodiments of the present disclosure, managing at least one of the request status or the processing status may include identifying the request status or the processing status for the request for processing the first user information according to a designated period, and updating a status value of the processing session based on a result of the identification.

According to certain embodiments of the present disclosure, the method may further include receiving a processing result corresponding to the request for processing the first user information from the at least one service server, and transmitting a feedback for the request for processing the first user information to the external electronic device 200 based on the received processing result.

Figure 7:
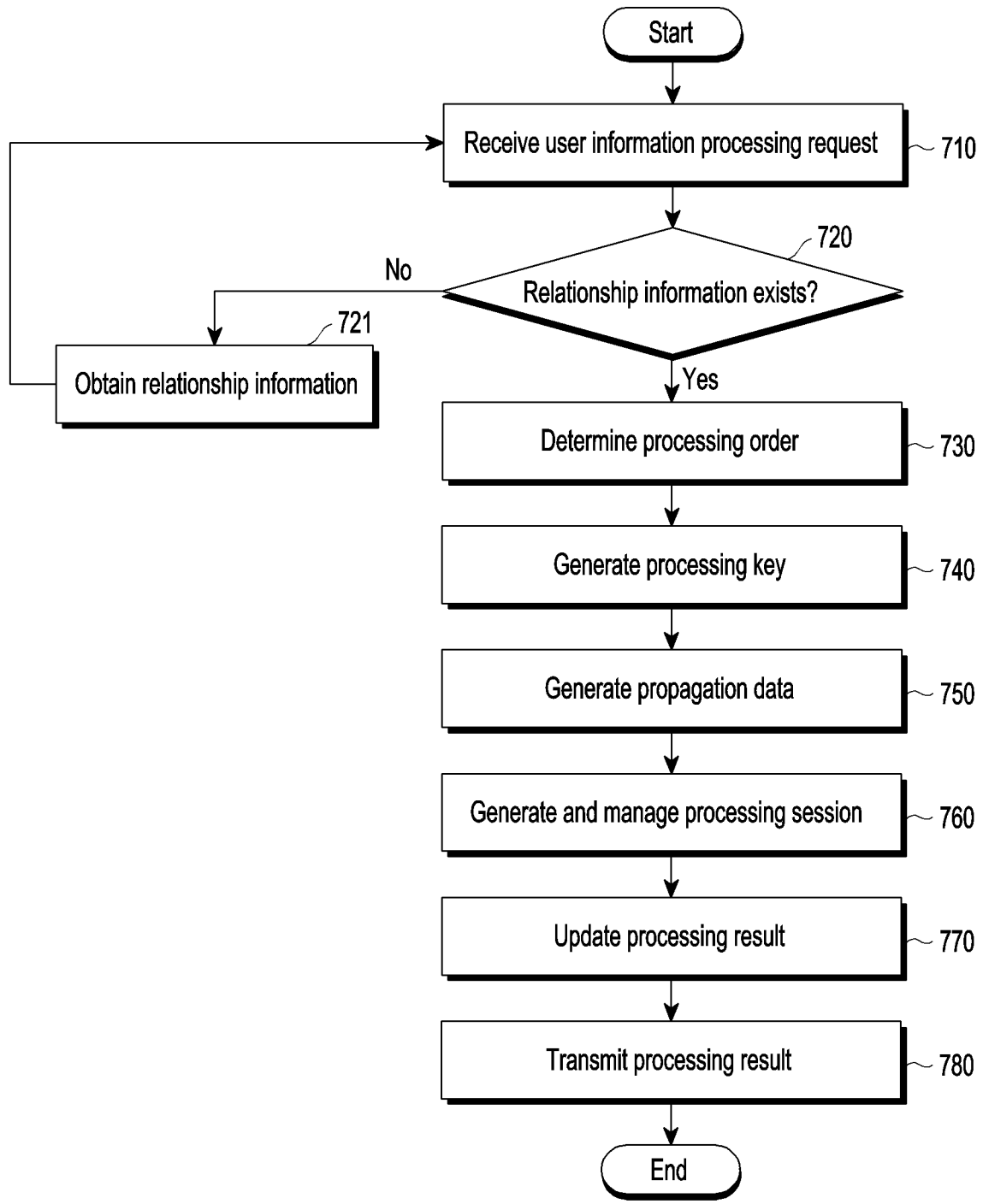
FIG. 7 is a flowchart illustrating a process of performing a process corresponding to a request for processing personal information according to certain embodiments of the present disclosure.

FIG. 7 is a flowchart illustrating a process of performing a process corresponding to a request for processing personal information according to certain embodiments of the present disclosure.

In operation 710, the electronic device 101 may receive a processing request for user information from an external electronic device 200 (e.g., a request to propagate an update to personal information across multiple service servers). The external electronic device 200 may be a device that is connected with the electronic device 101 via a network to process personal information or provide a management service through a web program or application and may correspond to the electronic device 102 or 104 of FIG. 1. The processing request may be a personal information processing request input by the user through the external electronic device 200, include at least one item among the processing type for the user information, action type, processing range, or processing scheme, and be transferred to the electronic device 101 through an application or web program installed on the external electronic device 200.

In operation 720, the electronic device 101 may identify a plurality of service servers storing at least part of the user information and determine whether the relationship information between the plurality of service servers exists in the electronic device 101. The relationship information defines a flow path along which the user information is shared between the plurality of service servers and may include map information in a hierarchical structure, corresponding to the flow path. If it is determined in operation 720 that the electronic device 101 lacks the relationship information, the electronic device 101 may obtain the relationship information from the external electronic device, or generate the relationship information based on data received from the plurality of service servers in operation 721. If it is determined in operation 720 that the electronic device 101 has the relationship information, the electronic device 101 may process the user information based on the relationship information.

In operation 730, the electronic device 101 may determine the processing order of the plurality of service servers to sequentially process/update the user information, based on the relationship information. For example, the processing order may be determined based on the flow path along which the user information is shared between the plurality of service servers, and the processing order may be determined to be the order corresponding to the hierarchical order of each server, corresponding to the flow path, or a reverse/inverse order thereof.

In operation 740, the electronic device 101 may generate a processing key used for the plurality of servers to process the user information. The processing key may be generated using at least one of the identification information managed to identify the user information distributed to the plurality of service servers or non-identification information managed, with the identification information processed for security. For example, the identification information may include a global unique identification (GUID) for identifying the personal information distributed to the plurality of service servers, and the non-identification information may include the target private key, i.e., mapping identification (MAPID), which is used to security-process the identification information.

In operation 750, the electronic device 101 may generate propagation data for transmitting the request for processing/updating user information to at least one of the plurality of servers. The propagation data may be generated based on at least one of the request for processing the user information, the processing order determined for each of the plurality of service servers in response to the request for processing the user information, or the processing key generated to process the user information. The at least one service server may be a processing target server included in the processing range included in the request for processing the user information among the plurality of service servers. The electronic device 101 may transmit the generated propagation data to the at least one service server according to the determined processing order.

In operation 760, the electronic device 101 may create and manage a processing session for the user information. The electronic device 101 may manage at least one of the processing/updating status or the request status for the request for processing the user information, using the generated processing session. The request status may indicate the progress of the update to the user information across the plurality of service servers, and may be indicated using state labels such as "waiting, transferred, completed, closed, or canceled." The processing status indicates the processing progress for the first user information corresponding to the processing request, and may be indicated using state labels such as "none, processing, failed, resending, or completed." When a processing session for the user information is created, the request status is set to "wait" and the processing status is set to "none," and it may be initialized. Thereafter, as the request for processing the user information is transmitted or the processing/updating of the user information proceeds across the service servers, the value of the request status or the processing status may be changed and updated to keep the user informed.

In operation 770, the electronic device 101 may identify the request status or the processing status for the request for processing the user information according to a designated period and, based on the result of the identification, update the status value of the processing session.

If the processing for the user information is designated as "complete" in the at least one service server (e.g., the request status and the processing status both are indicated as complete), the electronic device 101 may receive the processing result indicating the same. Based on the received processing result, the electronic device 101 may transmit feedback for the user information processing request to the external electronic device 200 in operation 780.

Figure 8:
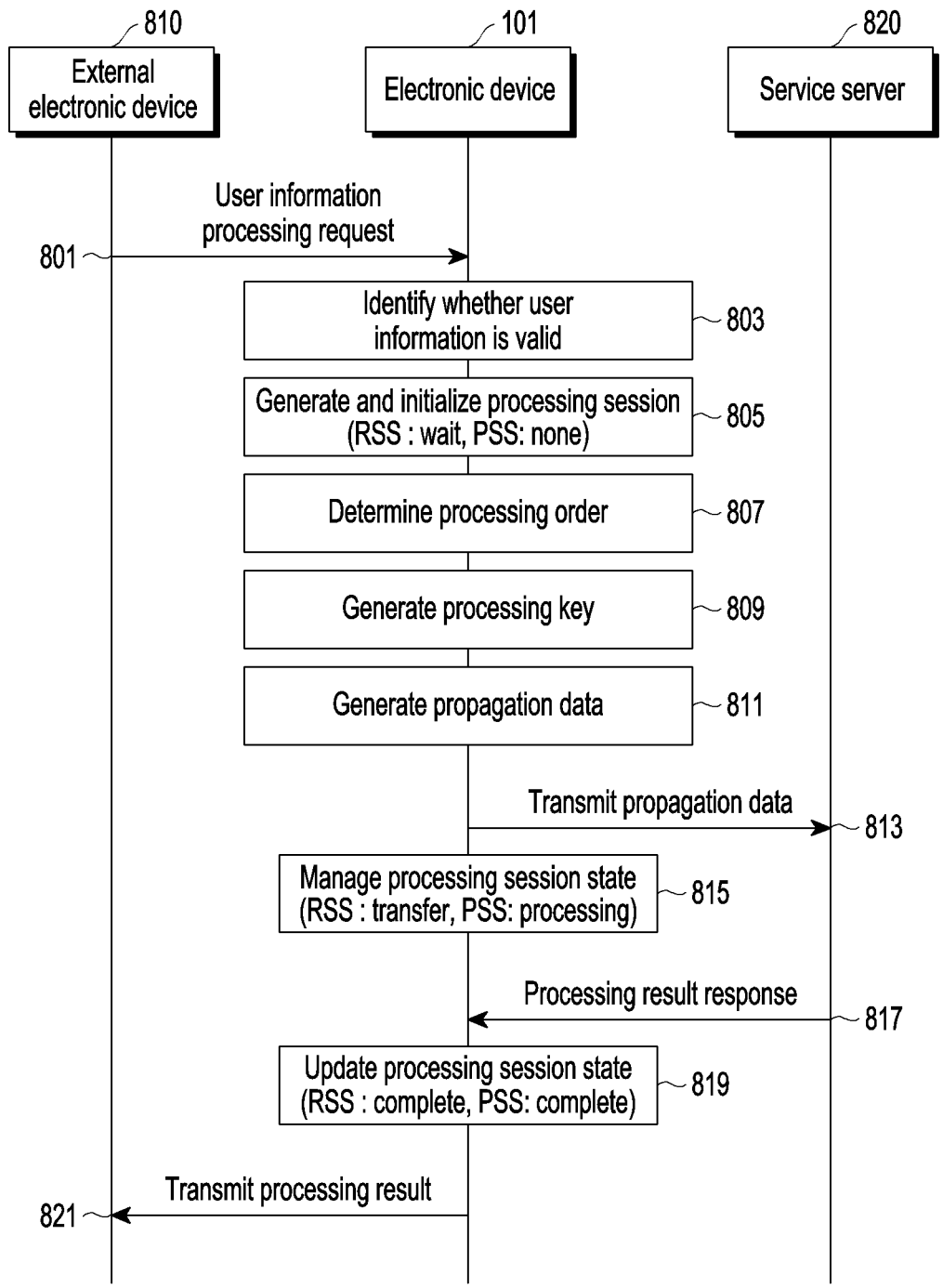
FIG. 8 is a view illustrating a procedure of processing personal information according to certain embodiments of the present disclosure.

FIG. 8 is a view illustrating a procedure of processing personal information according to certain embodiments of the present disclosure. Referring to FIG. 8, the electronic device 101 may be communicatively connected to an external electronic device 810 or a service server 820 through a network. The external electronic device 810 may be a device that may be connected with the electronic device 101 via a network to process personal information or provide a management service using a web program or application and may correspond to the electronic device 102 or 104 of FIG. 1 or the external electronic device 200 of FIG. 2. The service server 820 may be a service server that stores at least one user information and may correspond to the plurality of service servers 211 and 212 of FIG. 2 or the service servers 410, 420, 430, 440, and 450 of FIG. 4.

Referring to FIG. 8, in operation 801, the electronic device 101 may receive a request for processing/updating user information from the external electronic device 810 across one or more service servers 820. The processing request may include at least one of a processing type, an action type, a processing range, or a processing scheme for the user information.

In operation 803, the electronic device 101 may identify whether the user information or the target service is valid in response to the request for processing the user information. If it is identified in operation 803 that the user information or the target service designated by the processing request processing range is not valid, the electronic device 101 may notify the external electronic device 810 that the process corresponding to the processing request may not be performed.

If it is identified in operation 803 that the user information or the target service is valid, the electronic device 101 may generate a processing/updating session for the user information and set it to an initialized state in operation 805. The electronic device 101 may generate two transactions, a request status and a processing status, for the processing session. The electronic device 101 may map the two transactions generated for the processing session to each other and manage them, which may be shown in Table 4 below.

TABLE 4

| Request service | | Processing service | | | |
|---|---|---|---|---|---|
| Request service name | Request service code | Processing order | Processing service name | Processing service code | Meta Y/N |
| REQ SERVICE NAME | REQ SERVICE CODE | 1 | PRO SERVICE NAME(1) | PRO SERVICE CODE(1) | Y or N |
| | | 2 | PRO SERVICE NAME(2) | PRO SERVICE CODE(2) | Y or N |
| | | 3 | PRO SERVICE NAME(3) | PRO SERVICE CODE(3) | Y or N |
| | | 4 | PRO SERVICE NAME(4) | PRO SERVICE CODE(4) | Y or N |

In Table 4, the request service may be expressed with the service name and code of the target service indicated by the user information processing request received in operation 801, and the processing service may include the service name and code, processing order, or meta separator information for a plurality of services associated with the request service. The user information for the plurality of services may be processed according to the processing order, meta data associated between the processing services may be transmitted through the meta separator information, so that information processing for the service mapped to non-identification information may be performed. The transaction regarding the request status may be intended for managing the status of the request service, indicate the progress for the user information processing request, and be managed as a request service state (RSS). The RSS may be expressed as one of wait, transferred, complete, close, or cancel. The transaction regarding the request status may be generated including the request transaction ID, RSS, and result code as shown in Table 5.

TABLE 5

Request service

| Request transaction ID | Request service name | Request service code | RSS | Result code |
|---|---|---|---|---|
| REQ TRANSACTION ID | REQ SERVICE NAME | REQ SERVICE CODE | {wait, transferred, complete, close, cancel} | {200, 201, 500} |

The transaction regarding the processing status may be intended for state management of the processing service, indicate the progress of information processing corresponding to the processing request, and be managed as a processing service state (PSS). The PSS may be expressed as one of none, processing, fail, resending, or complete. The transaction regarding the processing status may be generated including the processing transaction ID, PSS, and result code as shown in Table 6.

TABLE 6

Processing service

| Processing transaction ID | Processing order | Processing service name | Processing service code | PSS | Result code |
|---|---|---|---|---|---|
| PRO TRANSACTION ID(1) | 1 | PRO SERVICE NAME(1) | PRO SERVICE CODE(1) | processing | |
| PRO TRANSACTION ID(2) | 2 | PRO SERVICE NAME(2) | PRO SERVICE CODE(2) | fail | 500 |
| PRO TRANSACTION ID(3) | 2 | PRO SERVICE NAME(3) | PRO SERVICE CODE(3) | complete | 200 or 201 |
| PRO TRANSACTION ID(4) | 3 | PRO SERVICE NAME(4) | PRO SERVICE CODE(4) | resending | |

In an embodiment, in the result code, 200 may indicate a case of normal processing, 201 may indicate a case where processing is impossible or it is difficult to identify a processing result because data does not exist, and 500 may indicate a request for retransmission of propagation data. In the case of a processing session in the initialized state, the RSS may be set to wait and the PSS may be set to none. Thereafter, the RSS or PSS value may be changed according to the progress of processing of the user information or transmission of a user information processing request. According to certain embodiments of the present disclosure, when the processing session is in an initialized state, the electronic device 101 may receive a request for canceling the processing request from the external electronic device 810, and in this case, the RSS may be changed from wait to cancel and be excluded from processing.

In operation 807, the electronic device 101 may determine the processing/updating order for the service server(s) 820 (e.g., assuming multiple such service servers) to sequentially process/update the user information, based on the relationship information between the plurality of service servers. For example, the relationship information may include hierarchical map information that defines the flow path along which the user information is propagated between the plurality of service servers, and the processing order may be determined to be the order corresponding to the hierarchical order of each service server, corresponding to the flow path, or a reverse order thereof.

In operation 809, the electronic device 101 may generate a processing key used for the plurality of service servers 820 to process the user information. The processing key may be generated using at least one of the identification information managed to identify the user information distributed to the plurality of service servers or non-identification information managed, with the identification information processed for security. For example, the identification information may include a global unique identification (GUID) for identifying the personal information distributed to the plurality of service servers, and the non-identification information may include the target private key, i.e., mapping identification (MAPID), which is used to security-process the identification information.

In operation 811, the electronic device 101 may generate propagation data for transmitting the request for processing/updating user information to at least one service server of the plurality of servers. The propagation data may be generated based on at least one of the request for processing the user information, the processing order determined for each of the plurality of service servers in response to the request for processing the user information, or the processing key generated to process the user information.

In operation 813, the electronic device 101 may transmit the generated propagation data to the plurality of service servers 820, according to the processing order determined via operation 807.

In operation 815, the electronic device 101 may manage the state of the processing session, corresponding to the progress of processing/updating the user information or transmission of the propagation data amongst the service server(s) 820. For example, if the propagation data is initially transmitted to the service server 820, the RSS may be changed to transferred, and the PSS may be changed to processing.

In operation 817, the electronic device 101 may receive a user information processing result response from the plurality of service servers 820. The processing result response may be identified using the result code.

In operation 819, the electronic device 101 may update the status value of the processing session based on the received processing result response. For example, if the electronic device 101 receives the result code '500' which indicates a request to resend the propagation data, the electronic device 101 may change the PSS into a fail status and, if the propagation data is resent later, change the PSS into a resending status. As another example, in response to reception of a response of the result of processing the user information after the processing of the user information is complete in the plurality of service servers 820, the electronic device 101 may update the PSS from processing or resending to complete or fail statuses. According to certain embodiments of the present disclosure, if all of the PSSs included in the processing transaction ID list associated with the request transaction ID are changed into complete, the electronic device 101 may switch the RSS included in the request transaction ID from transferred to complete. If the information processing corresponding to the processing session is fully complete, the electronic device 101 may transmit a processing result for the user information processing request to the external electronic device 810 in operation 821. The processing result may be provided as set forth in Table 7.

TABLE 7

Request service processing result

| Request transaction ID | Request service name | Request service code | Time of completion | Result code | Result message |
|---|---|---|---|---|---|
| REQ TRANS- ACTION ID | REQ SERVICE NAME | REQ SERVICE CODE | 2018-10-10 12:03:24 | 200 | PRO SERVICE RESULT CODE (200) |

After the processing result for the user information processing request is transmitted to the external electronic device 810, the electronic device 101 may change the RSS of the request transaction into close and terminate the processing session.

FIG. 9 is a view illustrating an example of propagation data generated in response to a request for processing personal information according to certain embodiments of the present disclosure.

The electronic device 101 may generate propagation data for transferring the personal information processing/updating request received from the external electronic device 200 to the plurality of service servers. The external electronic device 200 may be connected with the electronic device 101 via a network to process personal information or provide a management service through a web program or application and may correspond to the electronic device 102 or 104 of FIG. 1.

Referring to FIG. 9, the propagation data may be generated for each of the plurality of services sharing at least part of the personal information. The plurality of services may include target services (processing range) designated by the processing request and processing services interworking with the target services to share the personal information.

The propagation data shown in FIG. 9 may be one generated for the service server providing a PENUP service and be marked with the corresponding processing service code 901 and the processing service name 903. The propagation data may be generated based on the processing key or processing order determined for each service server corresponding to the processing request and the items included in the personal information processing request received from the external electronic device 200. For example, the electronic device 101 may generate the propagation data to include the request service code 905 and request service name 907 designated by the processing request, the processing order 909 determined for the service server, the GUID 911 which is the unique identification information for the service server, the account ID 913 which is to be notified of the processing result corresponding to the request, the processing type 915, the action type 917, the number of times 919 in which resending of the propagation data is attempted, or the time 921 at which the user information processing request is received from the external electronic device 200. The propagation data may add the sub ticket ID 923 generated in response to the user information processing request, sub ticket count 925, or main ticket 927. The main ticket may indicate a processing list issued according to the processing request. The sub ticket is a processing list derived by the main ticket, and a processing list of target services indicated by the processing request may be generated as the sub ticket corresponding to the main ticket.

Figure 10:
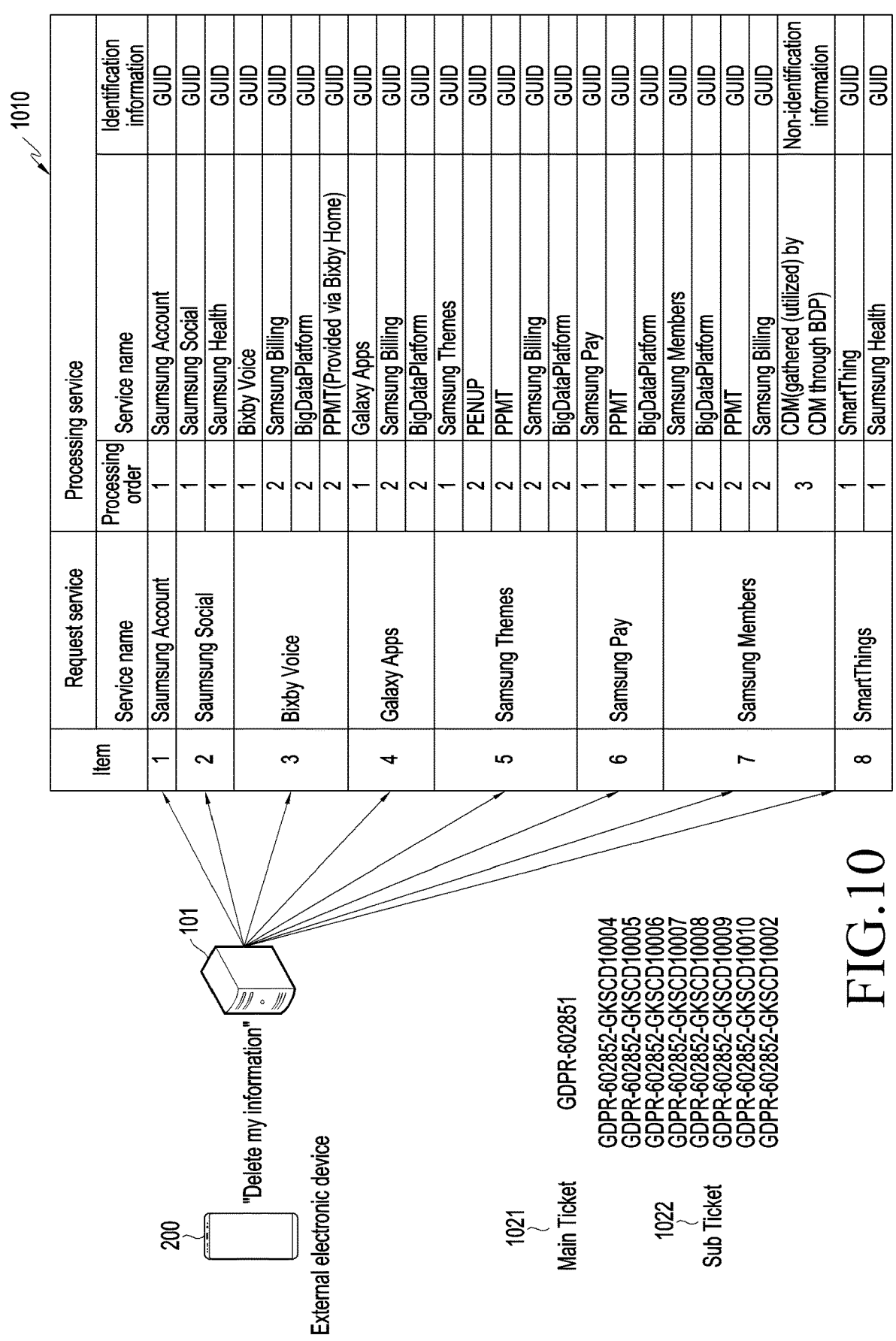
FIG. 10 is a flowchart illustrating a scheme of determining a target for processing personal information and transmitting a request for processing personal information according to certain embodiments of the present disclosure.

FIG. 10 is a flowchart illustrating a scheme of determining a target for processing personal information and transmitting a request for processing personal information according to certain embodiments of the present disclosure.

Upon receiving a processing request to delete the user's personal information from the external electronic device 200, the electronic device 101 may generate a processing list 1010 to execute the processing request. The external electronic device 200 may be connected with the electronic device 101 via a network to process personal information, or provide a management service through a web program or application, and may correspond to the electronic device 102 or 104 of FIG. 1. The processing list 1010 may include the request service server designated by the processing request, the processing service server sharing the user information via interworking with the request service server, and the processing order and processing key determined for each processing service server. The information regarding the processing service server, processing order, or processing key may be identified based on relationship information about the plurality of service servers storing at least a piece of the user information, and the electronic device 101 may pre-store the relationship information.

Referring to FIG. 10, the electronic device 101 may issue a main ticket 1021 corresponding to the processing list 1010 generated according to the processing request and eight sub tickets 1022 derived by the main ticket 1021. The sub tickets 1022 may be issued corresponding to the number of the request service servers, and 25 processing services, which interwork with the request service to share at least part of the user information, may be included in the processing list of the sub tickets 1022.

FIGS. 11A to 11F are views illustrating an example scheme of providing a request state for personal information and a result regarding the processing state according to certain embodiments of the present disclosure. The external electronic device 200 may look up the information processing status in a plurality of service servers according to a request for processing the user information through an application or web program connectable to the electronic device 101 and it may be displayed on the external electronic device 200 as shown in FIGS. 11A to 11F. The external electronic device 200 may correspond to the electronic device 102 connected with the electronic device 101 via the first network 198 or the electronic device 104 connected with the electronic device 101 via the second network 199 in FIG. 1.

When the external electronic device 200 looks up the processing status for the request service, the progress for the user information processing/updating request may be provided for each service item. For example, before the propagation data is generated for each of the plurality of service servers in response to the processing request, the RSS may be displayed as a wait status in the information processing status lookup screen 1110 of FIG. 11A and, after the propagation data is transmitted to the plurality of service servers, the RSS may be displayed as a transferred status as in an information processing status lookup screen 1120 of FIG. 11B.

When the processing status for the processing service is looked up on the external electronic device 200, the progress of processing of the user information may be provided for each service item. For example, after the propagation data is transmitted to the plurality of service servers, the PSS may be displayed as a processing status in the information processing status lookup screen 1130 of FIG. 11C. The PSS may be changed in the information processing status lookup screen 1140 of FIG. 11D, by the various result codes received from the plurality of service servers. When the electronic device 101 receives the result code '200' which indicates the normal processing of the propagation data or the result code '201' which indicates that there is no user information, the PSS may be displayed as a complete status. When the electronic device 101 receives the result code '500' which indicates a request for resending the propagation data, the PSS may be displayed as a fail status. Thereafter, if the propagation data is resent, the PSS for the corresponding service item may be changed into the resending status as in an information processing status lookup screen 1150 of FIG. 11E. After the processing for the user information in the plurality of service servers is complete, the PSS of each service item may be changed from processing or resending statuses, to complete or fail statuses.

Figure 11F:
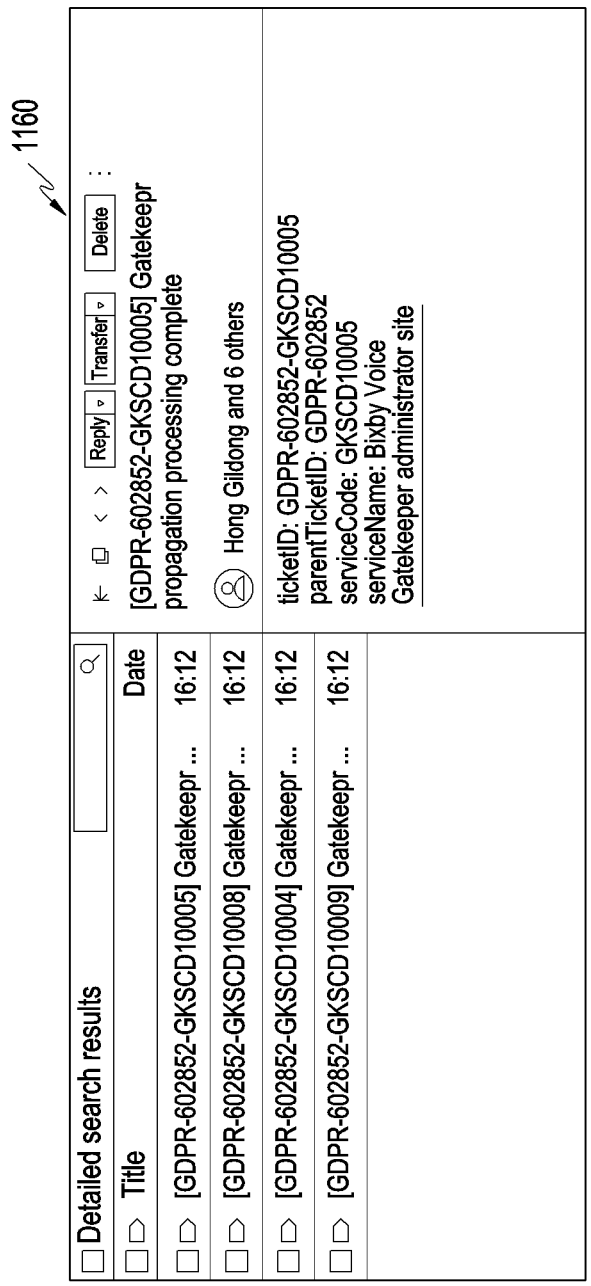

According to certain embodiments of the present disclosure, if the processing for the user information in the plurality of service servers is the complete status, the electronic device 101 may transmit a processing result 1160 for the user information processing request to the external electronic device 200 as shown in FIG. 11F. The processing result may be generated and provided as an email or a separate message or may be provided through an application installed on the external electronic device 200.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to certain embodiments, there may be provided a storage medium storing instructions configured to, when executed by at least one processor 120, enable the at least one processor 120 to perform at least one operation which, in a method for managing personal information by an electronic device, may include receiving a request for processing first user information from an external electronic device (e.g., the external electronic device 200 of FIG. 2), determining a processing order of the first user information for a plurality of servers, based on relationship information between the plurality of service servers (e.g., the service server 1 410 to the service server 5 450 of FIG. 4A) storing at least one user information, and transmitting the first user information processing request to at least one of the plurality of service servers based on the processing order.

The embodiments disclosed herein are proposed for description and understanding of the disclosed technology and does not limit the present disclosure. Accordingly, the disclosure should be interpreted as including all changes or certain embodiments based on the disclosure.

What is claimed is:

1. An electronic device, comprising:
   a communication circuitry;
   a processor; and
   memory operatively connected with the processor and storing a hierarchical map defining a flow path by which same user information is sequentially propagated and copied through a plurality of service servers, wherein the memory stores instructions which, when executed by the processor, cause the electronic device to:
   receive, from an external electronic device through the communication module, a request of deleting the same user information sequentially and respectively at the plurality of service servers in a hierarchical order, wherein the request of deleting the same user information sequentially and respectively at the plurality of service servers in the hierarchical order includes a processing type indicating deletion for discarding the same user information, an action type indicating registering or clearing processing of the same user information, and a processing scheme indicating an ascending order or a descending order for processing the same user information;
   based on the flow path included in the hierarchical map, identify the hierarchical order of the plurality of service servers each of which stores the same user information, the hierarchical order corresponding to a reverse path of the flow path based on the processing scheme indicating the descending order;
   generate propagation data including the processing type indicating deletion for discarding the same user information, the action type indicating registering or clearing processing of the same user information, the processing scheme indicating the ascending order or the descending order for processing the same user information, the hierarchical order of the plurality of service servers, and a processing key for processing the same user information; and
   transmit, to a first service server in the hierarchical order of the plurality of service servers through the communication module, the propagation data such that the same user information stored at each of the plurality of service servers is sequentially and respectively deleted at the plurality of service servers in the hierarchical order.

2. The electronic device of claim 1, wherein the instructions cause the electronic device to:
   identify the plurality of service servers each storing the same user information, using identification information or non-identification information associated with the same user information.

3. The electronic device of claim 2, wherein the instructions cause the electronic device to:
   execute a search for a non-identification information server storing the non-identification information associated with the same user information;
   identify an identification information server corresponding to a parent node of the non-identification information server based on the hierarchical map; and
   generate the processing key for processing the same user information, using at least part of a mapping key between the non-identification information server and the identification information server, or a unique key of the identification information server.

4. The electronic device of claim 1, wherein the instructions cause the electronic device to:
   generate a processing session corresponding to the request; and
   manage a request status and a processing status for the request using the processing session, wherein the instructions further cause the processor to:
   identify the request status and the processing status for the request according to a designated period; and
   update a status value of the processing session based on the identified request status and the processing status.

5. The electronic device of claim 1, wherein the instructions cause the electronic device to:
   receive a processing result for the request from the first service server through the communication module; and
   transmit feedback for the request to the external electronic device based on the received processing result.

6. A method in an electronic device, comprising:
   receiving, from an external electronic device, a request of deleting same user information sequentially and respectively at a plurality of service servers in a hierarchical order, wherein the request of deleting the same user information sequentially and respectively at the plurality of service servers in the hierarchical order includes a processing type indicating deletion for discarding the same user information, an action type indicating registering or clearing processing of the same user information, and a processing scheme indicating an ascending order or a descending order for processing the same user information;
   based on a hierarchical map defining a flow path by which the same user information is sequentially propagated and copied through the plurality of service servers, using at least one processor, identifying the hierarchical order of the plurality of servers each of which stores the same user information, the hierarchical order corresponding to a reverse path of the flow path based on the processing scheme indicating the descending order;
   generating propagation data including the processing type indicating deletion for discarding the same user information, the action type indicating registering or clearing processing of the same user information, the processing scheme indicating the ascending order or the descending order for processing the same user information, the hierarchical order of the plurality of service servers, and a processing key for processing the same user information; and
   transmitting, to a first service server in the hierarchical order of the plurality of service servers, the request of deleting the propagation data such that the same user information stored at each of the plurality of service servers is sequentially and respectively deleted at the plurality of service servers in the hierarchical order.

7. The method of claim 6, wherein identifying the processing order of the same user information includes:

identifying the plurality of service servers using identification information or non-identification information associated with the same user information,
wherein each of the plurality of service servers stores the same user information.

8. The method of claim 6, wherein identifying the processing order of the same user information includes:
executing a search for a non-identification information server storing non-identification information associated with the same user information;
identifying an identification information server corresponding to a parent node of the non-identification information server based on the hierarchical map; and
generating the processing key for processing the same user information, using at least part of a mapping key between the non-identification information server and the identification information server or a unique key of the identification information server.

9. The method of claim 6, further comprising:
generating a processing session corresponding to the request; and
managing a request status and a processing status for the request using the processing session, including:
identifying the request status and the processing status for the request according to a designated period, and
updating a status value of the processing session based on the identified request status and the processing status.

10. The method of claim 6, further comprising:
receiving a processing result for the request from the first service server; and
transmitting feedback for the request to the external electronic device based on the received processing result.

11. A non-transitory computer-readable storage medium for storing instructions which, when executed by at least one processor of an electronic device, cause the electronic device to perform:
receiving, from an external electronic device, a request of deleting same user information sequentially and respectively at a plurality of service servers in a hierarchical order, wherein the request of deleting the same user information sequentially and respectively at the plurality of service servers in the hierarchical order includes a processing type indicating deletion for discarding the same user information, an action type indicating registering or clearing processing of the same user information, and a processing scheme indicating an ascending order or a descending order for processing the same user information;
based on a hierarchical map defining a flow path by which the same user information is sequentially propagated and copied through the plurality of service servers, using at least one processor, identifying the hierarchical order of the plurality of servers each of which stores the same user information, the hierarchical order corresponding to a reverse path of the flow path based on the processing scheme indicating the descending order;
generating propagation data including the processing type indicating deletion for discarding the same user information, the action type indicating registering or clearing processing of the same user information, the processing scheme indicating the ascending order or the descending order for processing the same user information, the hierarchical order of the plurality of service servers, and a processing key for processing the same user information; and
transmitting, to a first service server in the hierarchical order of the plurality of service servers, the request of deleting the propagation data such that the same user information stored at each of the plurality of service servers is sequentially and respectively deleted at the plurality of service servers in the hierarchical order.

\* \* \* \* \*